(12) United States Patent
Flehmig et al.

(10) Patent No.: US 8,151,429 B2
(45) Date of Patent: Apr. 10, 2012

(54) METHOD FOR PRODUCING A HEAVY DUTY COMPOSITE PART

(75) Inventors: Thomas Flehmig, Ratingen (DE); Lothar Patberg, Moers (DE)

(73) Assignee: ThyssenKrupp Steel AG, Duisburg (DE)

( * ) Notice: Subject to any disclaimer, the term of this patent is extended or adjusted under 35 U.S.C. 154(b) by 905 days.

(21) Appl. No.: 12/096,846

(22) PCT Filed: Nov. 29, 2006

(86) PCT No.: PCT/EP2006/069064
§ 371 (c)(1),
(2), (4) Date: Aug. 18, 2008

(87) PCT Pub. No.: WO2007/068591
PCT Pub. Date: Jun. 21, 2007

(65) Prior Publication Data
US 2008/0311422 A1    Dec. 18, 2008

(30) Foreign Application Priority Data

Dec. 15, 2005 (DE) .................. 10 2005 060 486

(51) Int. Cl.
*B21D 39/03* (2006.01)
(52) U.S. Cl. ............. 29/428; 29/447; 29/505; 29/521; 29/524; 403/282; 428/615; 428/684
(58) Field of Classification Search ............ 29/897.2, 29/428, 447, 505, 521, 524, 527.1, 432, 432.1; 403/280, 282; 428/615, 684
See application file for complete search history.

(56) References Cited

U.S. PATENT DOCUMENTS

| 5,924,316 A | 7/1999 | Streubel et al. ............ 72/51 |
| 6,494,360 B1 | 12/2002 | Flehmig et al. ............ 228/173.6 |

FOREIGN PATENT DOCUMENTS

| DE | 82 04 257 U1 | 8/1982 |
| DE | 262 471 A1 | 11/1988 |
| DE | 39 36 967 A1 | 8/1990 |
| DE | 198 27 798 A1 | 12/1999 |
| DE | 10 2004 008301 | 9/2005 |
| EP | 0 788 849 A1 | 8/1997 |
| EP | 1 595 611 A | 11/2005 |
| FR | 2 528 336 A1 | 12/1983 |
| FR | 2 741 553 A1 | 5/1997 |
| GB | 944 094 A | 12/1963 |
| GB | 1 515 951 A | 6/1978 |
| JP | 1125 4076 A | 9/1999 |

OTHER PUBLICATIONS

International Search Report for International Application No. PCT/EP2006/069064.

*Primary Examiner* — Jermie Cozart
(74) *Attorney, Agent, or Firm* — Proskauer Rose LLP

(57) ABSTRACT

A method for producing a composite part is provided. The method includes a first and at least one second part, wherein the first part at least in part is made of a first metal and the second part at least in part is made of another metal that has a lower melting temperature than that of the first metal. Composite parts produced by the method are also provided. The method for producing composite parts which have an improved load-bearing capacity and yet low weight, is achieved by the fact that at least one breakthrough encompassing a breakthrough collar is introduced into the first part and the second part is non-positively and/or positively moulded onto the first part at least in the area of the breakthrough and the breakthrough collar by heating the second part and applying pressure to said second part.

10 Claims, 2 Drawing Sheets

METHOD FOR PRODUCING A HEAVY DUTY COMPOSITE PART

CROSS-REFERENCE TO RELATED APPLICATIONS

This application is a National Phase Application of International Application No. PCT/EP2006/069064, filed on Nov. 29, 2006, which claims the benefit of and priority to German patent application no. DE 10 2005 060 486.2, filed Dec. 15, 2005. The disclosure of each of the above applications is incorporated herein by reference in their entirety.

FIELD OF THE INVENTION

The invention relates to a method for producing a composite part comprising a first and at least one second part, wherein the first part at least in part is made of a first metal and the second part at least in part is made of another metal that has a lower melting temperature than that of the first metal, as well as to composite parts produced according to the method. The invention also relates to an advantageous use of the composite parts.

BACKGROUND

In order to reduce weight, composite parts, which are at the same time heavy duty apart from low weight, are being used more and more in the automotive industry. Due to the high loads frequently occurring on the composite parts, the joints between the individual, different materials of the composite part are also exposed to considerable stress. At the same time, the production method for making heavy-duty composite parts is to be configured particularly simply, so that production costs are minimal.

Composite parts, which include different materials, for example a combination of metal and plastic, are frequently used as brackets, in particular with connection facilities for functional elements, the instrument panel in the vehicle interior for example. In this case, due to recent recycling regulations the aim, as far as possible, is only to use recyclable materials or composite parts made thereof. Composite parts including metal and plastic, with regard to recyclability, are basically inferior to composite parts including two different metals.

A composite part made from different metals, which includes a plate made of a steel material as well as a second plate made of an aluminium material, the plate made of the steel material having perforations, is known from the prior art, from the Japanese Patent Application JP 11 254076 A for example. By heating up the aluminium plate and applying pressure, the softening aluminium of the aluminium plate flows into the perforations of the steel plate and leads to a positive connection between the steel plate and the aluminium plate, so that a composite part is obtained. However, the strength of the composite part is limited by the strength of the aluminium material and the cross section of the perforations of the steel plate.

SUMMARY OF THE INVENTION

In one aspect, the present invention provides a simple method for producing composite parts, wherein composite parts can be produced that have improved load-bearing capacity and yet low weight. In another aspect, the invention provides corresponding composite parts and a use of the composite parts.

In accordance with an aspect of the present invention, the method includes a composite part comprising a first and at least one second part, wherein the first part at least in part is made of a first metal and the second part at least in part is made of another metal that has a lower melting temperature than that of the first metal. The composite part includes a hollow section, in particular a "tailored tube" or "modular tube", which is produced from a flat plate utilizing the rolling round technique, and is used as first part. A die in a device for executing the rolling round technique, using at least one punch, introduces a breakthrough encompassing a breakthrough collar into the plate of the first part. The second part is non-positively and/or positively moulded onto the first part at least in the area of the breakthrough and the breakthrough collar by heating and applying pressure to the second part.

A composite part with substantially higher stress limit is made available by a method where a hollow section, particularly a "tailored tube" or "modular tube" is used as the first part. The hollow section has substantially higher rigidity compared with a flat formed metal part, so that a composite part can be produced with overall increased load-bearing capacity. When "tailored tubes" are used for producing a composite part, a composite part can be made available, which on the one hand has maximum load-bearing capacity and on the other hand minimum weight, since "tailored tubes" not only have wall thicknesses exactly suited to the load, but also are made from steel grades corresponding to the load. "Modular tubes" have variable cross sections in the longitudinal direction and are thus adapted to variable loads. In some embodiments, the hollow section "tailored tube" or "modular tube" is produced from a flat plate utilizing a rolling round technique.

The rolling round technique is known from the published German Patent Application DE 198 27 798 A1, owned by the applicant, which relates to a production method for hollow sections, wherein a plane metal sheet is transformed into a hollow section by moving the tool halves of a forming tool with a die on the inside and optionally then longitudinally welded. In this case, the use of the rolling round technique can ensure as much flexibility as possible with low production costs at the same time. Furthermore, it is possible to integrate, in a simple way, as many process steps as possible in a device for executing the rolling round technique. In certain embodiments, simple integration of process steps for introducing at least one breakthrough into a hollow section is achieved by the fact that a die in a device for executing the rolling round technique, using at least one punch, introduces a breakthrough encompassing a breakthrough collar into the plate of the first part. Because the second part is made of a metal that has a lower melting temperature than that of the metal of the first part, when heated the second part becomes soft in comparison to the first part, so that by applying pressure to both parts, the breakthrough collar can penetrate into the second metal part. In various embodiments, the metal of the second part of the composite part can penetrate at least partially into the breakthrough in the first part of the composite part. Upon cooling, a solid non-positive and positive connection develops between the first and second parts made of different metals. The breakthrough collar, which is surrounded by the metal of the second part, can provide that the load-bearing capacity of the connections between the two parts of the composite part, and therefore also of the composite part itself, can be increased and is no longer dependent on the diameter of the breakthrough in the first part.

In some embodiments, the first part at least in part is made of steel or a steel alloy. Steel or a steel alloy on the one hand has a high melting temperature and furthermore can be processed with known methods, so that tooling expenses, for example for introducing the breakthroughs into the first part, can be kept to a minimum.

In certain embodiments, the second part is made of a light metal, for example aluminium or magnesium or their alloys. The weight of the composite part can be further reduced, without the load-bearing capacity of the composite part being substantially decreased.

In various embodiments, the breakthrough of the first part is introduced into the plate before or during transformation of the plate of the first part into a hollow section, so that the second part of the composite part can be moulded on the first part directly after the hollow section has been produced.

In an embodiment, a tool half of the device for executing the rolling round technique is provided with a hole corresponding to the punch so that integration of the introduction of breakthroughs into the plate is facilitated during execution of the rolling round technique. A plurality of punches or burls can be provided, wherein a plurality of breakthroughs encompassing breakthrough collars can be introduced into the plate of the first part by means of the die of the device for executing the rolling round technique. A separate device and/or separate working stages for introduction of the breakthroughs into the first plate are not necessary due to these being integrated into the device for executing the rolling round technique, so that the method for producing the composite part is simplified.

In certain embodiments, the second part of said composite part when heated, becomes at least partially plastic and, for non-positive or positive connection, the breakthrough collar of the first part is pressed into the area of the second part, which has become plastic. It is possible to ensure that the breakthrough collars substantially maintain their shape, even after the second part has been moulded on. Thereby, a particularly good non-positive and/or positive connection between the first and second parts of the composite part can be obtained.

In various embodiments, the second part can be heated in a particularly simple way due to the fact that the second part is heated in a furnace, by means of a heating plate, electrical current and/or induction. After the second part has been heated, it can be connected by applying pressure. The second part can be heated at the same time as the first part, wherein due to the different melting temperature, the first part may lose little or none of the strength and penetration of the breakthrough collars into the material of the second part penetration of the material of the second part into the breakthrough in the first part can also be facilitated.

A connection between the first and the second part, designed for particularly high loads can arise when the first and second part are connected and when the material of the second part totally penetrates the breakthrough of the first part and entirely surrounds the breakthrough collar.

In certain embodiments, a composite part comprising a first and at least one second part, wherein the first part is made of a first metal and the second part at least in part is made of a metal that has a lower melting temperature than that of the first metal a hollow section, particularly a "tailored tube" or "modular tube", produced utilizing the rolling round technique. The hollow tube is provided as the first part and the first part has at least one breakthrough encompassing a breakthrough collar, wherein the breakthrough and the breakthrough collar are at least partially penetrated and/or surrounded by the material of the second part forming a non-positive or positive connection.

An increase of the load-bearing capacity of the composite part is initially achieved by the fact that the first part is a hollow section, particularly a "tailored tube" or "modular tube". Utilization of the rolling round technique also represents a particularly economic method for producing the composite part. Due to the combination of breakthrough and breakthrough collar, which are at least partially penetrated and surrounded by the material of the second part with positive and/or non-positive connection, the strength of the composite part is no longer just determined by the strength of the second metal and the cross section of the breakthrough, but additionally improved by the breakthrough collar surrounded by the material of the second part. Furthermore, the composite part according to the invention is characterized by outstanding recyclability.

If the first part is made at least in part of steel or a steel alloy, a first part with a relatively high melting temperature and good mechanical properties, as well as with good ductility and workability, can be made available. The use of steel or a steel alloy for the first part also allows, as already explained, the use of conventional production techniques for introducing the breakthroughs into the plate.

Particularly good weight saving with maximum strength is obtained by the fact that the second part is made at least in part of a light metal, for example, aluminium, magnesium or an alloy of the same.

The composite parts according to the invention can be used as instrument panel brackets, outer skin bearers or seat supports in a motor vehicle. Due to their high mechanical load-bearing capacity, composite parts as described herein can at the same time serve as cross beams or bearers, for example for the windscreen, certain pillar groups of the vehicle or the seats.

DETAILED DESCRIPTION

Figure 1:
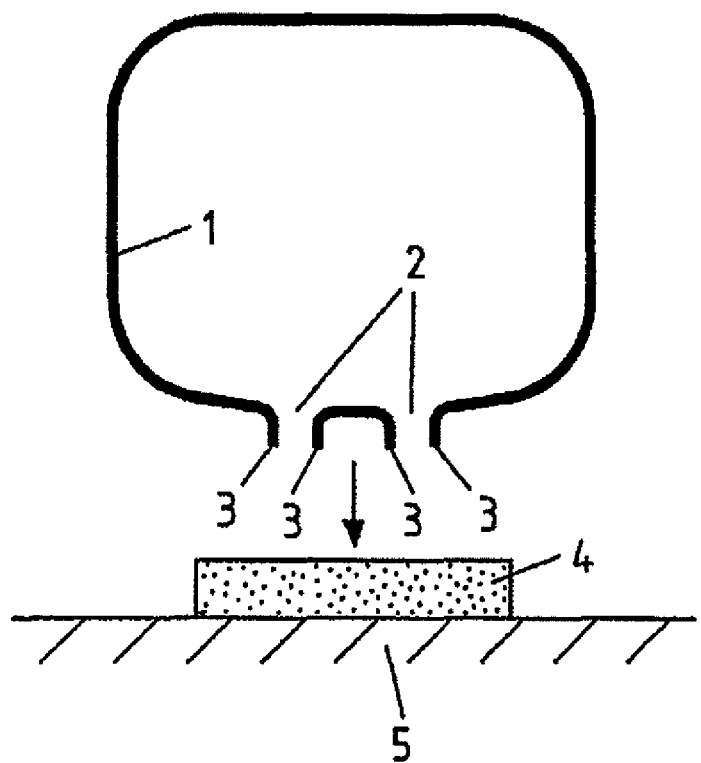
FIG. 1 shows a cross-sectional view of an exemplary embodiment of a composite part in a not yet connected state.

FIG. 1 shows a cross-sectional view of a first part 1 of the composite part, which is preferably made of steel or a steel alloy. A material with a very high melting temperature and at the same time good transforming properties can be made available by using steel or a steel alloy. As can be recognized in FIG. 1, the first part of the composite part has the form of a hollow section 1, in this case a tube, which can be produced from a flat plate utilizing the rolling round technique for example. However, a simple flat plate can also be used as the first part. In the present exemplary embodiment, the hollow section 1 is fabricated as a "tailored tube" and, not illustrated in the drawing, has, for example, different wall thicknesses in the longitudinal direction, which are suited to the specific loads in the fitted state. FIG. 1 shows that two breakthroughs 2 encompassing the corresponding breakthrough collars 3, which are introduced during production of the hollow section 1 from a flat plate utilizing the rolling round technique for example, are provided in the hollow section 1 along the sectional axis. The second part of the composite part 4 is arranged on a working plate 5, which serves to heat the second part 4 of the composite part according to the invention. The second part of the composite part, for example, can be made of a light metal, aluminium or magnesium for example.

Figure 2:
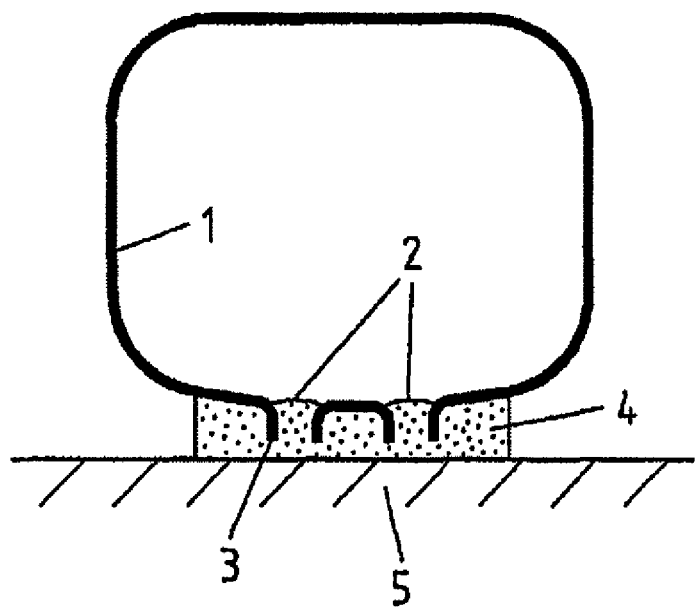
FIG. 2 shows a cross-sectional view of the joint of the first and second part of the composite part of FIG. 1 consisting of a first and a second moulded part and FIG. 3 shows a perspective view of the composite part of FIG. 1 consisting of a first and a second further moulded part.

FIG. 2 shows in a cross-sectional view, the method for moulding the second part 4 onto the hollow section 1. When the second part 4 is heated, this becomes soft or plastic, so that by applying pressure to the hollow section 1, the breakthrough collars 3 can penetrate the material, which has become plastic, of the second part 4 and the breakthroughs 2 as well as the breakthrough collars 3, after pressure is applied to the two parts 1, 4, can be completely penetrated and surrounded by the material of the second part 4. Thereby, non-positive and positive connection, which meets high stability requirements, is obtained between the first part 1 and the second part 4 of the composite part. Because the breakthrough collars 3 can completely penetrate into the material of the second part of the composite part, not only the material penetrated by the breakthroughs 2 and the cross section of the breakthroughs 2, but the entire material thickness of the second part 4, contribute to the stability of the connection between the first and the second part.

Figure 3:
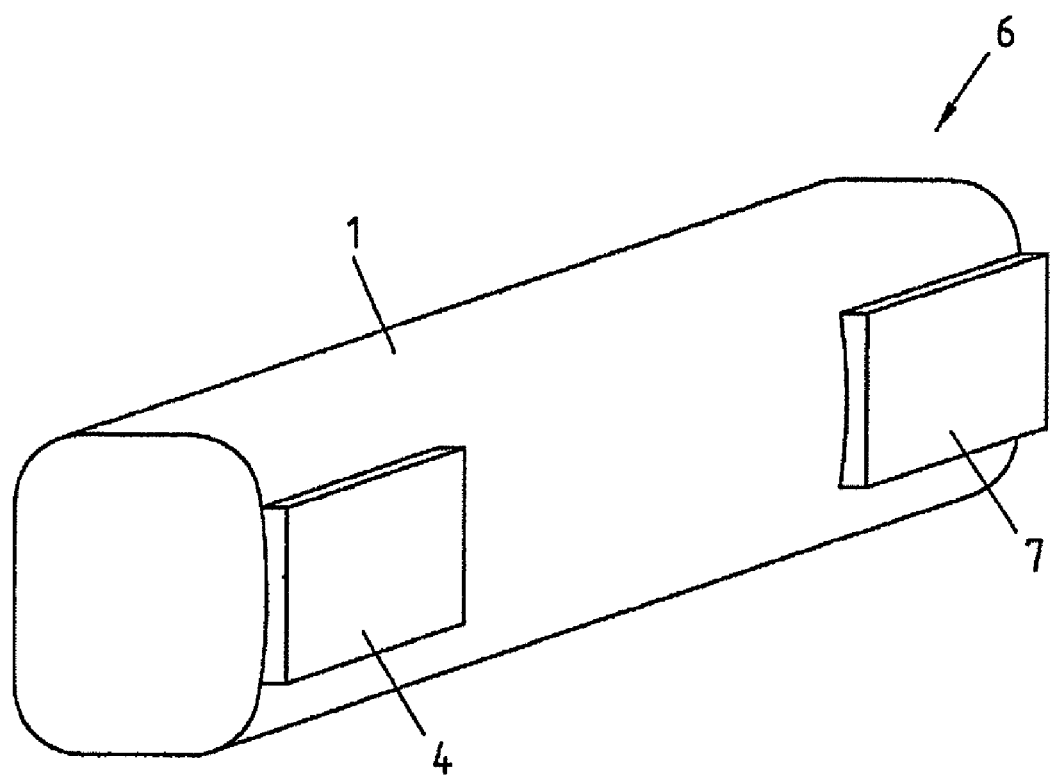

FIG. 3 shows an exemplary embodiment of a composite part 6 including a first hollow section 1 and two further moulded parts 4, 7, which have been moulded onto the first hollow section. The correspondingly moulded second parts 4, 7 can take over various functions. For example, the moulded parts 4, 7 can be configured as reinforcement elements, bearing elements or connection elements.

Due to the high mechanical load-bearing capacity of composite parts produced in this way, these parts can be used in automotive construction. For example, these composite parts are used as instrument panel brackets, outer skin bearers or seat supports. Due to the high load-bearing capacity of the hollow sections, the composite parts at the same time can also be cross beams or bearers, for example for the windscreen, certain pillar groups of the vehicle or the seats.

The invention claimed is:

1. Method for producing a composite part comprising a first part and at least one second part, wherein the first part at least in part is made of a first metal and the second part at least in part is made of another metal that has a lower melting temperature than that of the first metal, the method comprising,
producing a hollow section, from a flat plate utilizing a rolling round technique,
using the hollow section as the first part,
introducing a breakthrough encompassing a breakthrough collar into a plate of the first part using a die in a device for executing the rolling round technique with at least one punch, and
non-positively and/or positively molding the second part onto the first part at least in the area of the breakthrough and the breakthrough collar by heating the second part and applying pressure to the second part.

2. Method for producing a composite part according to claim 1, wherein the first part is made at least in part of steel or a steel alloy.

3. Method for producing a composite part according to claim 1, wherein the second part is made of a light metal.

4. Method for producing a composite part according to claim 3 wherein the light metal comprises aluminum, magnesium, or an alloy thereof.

5. Method for producing a composite part according to claim 1, further comprising introducing the at least one breakthrough of the first part into the plate before or during transformation of the plate into a hollow section.

6. Method for producing a composite part according to claim 1, further comprising providing a hole corresponding with a punch in a tool half of the device for executing the rolling round technique.

7. Method for producing a composite part according to claim 1, further comprising heating until the second part becomes at least partially plastic and for non-positive and/or positive connection, pressing the at least one breakthrough collar of the first part into an area of the second part which has become at least partially plastic.

8. Method for producing a composite part according to claim 1, further comprising heating the second part in a furnace, on a heating plate and/or by means of electrical current and/or by induction.

9. Method for producing a composite part according to claim 1, further comprising connecting the first and second parts such that material of the second part completely penetrates the breakthrough of the first part and/or entirely surrounds the breakthrough collar.

10. Method for producing a composite part according to claim 1, wherein the hollow section is a tailored tube or modular tube.

* * * * *